United States Patent [19]

Rosaen

[11] 4,139,468

[45] Feb. 13, 1979

[54] FLUID FILTERING DEVICE

[76] Inventor: Nils O. Rosaen, 7108 Bridge Way, West Bloomfield, Mich. 48033

[21] Appl. No.: 841,125

[22] Filed: Oct. 11, 1977

Related U.S. Application Data

[63] Continuation-in-part of Ser. No. 669,610, Mar. 23, 1976, abandoned.

[51] Int. Cl.² .......................................... B01D 27/10
[52] U.S. Cl. .................................. 210/130; 210/235; 210/430; 210/444; 210/454
[58] Field of Search ................. 210/130–133, 210/232, 390, 429, 430, 431, 435, 437, 444, 454, 487, 493, 235, 74, 99

[56] References Cited
U.S. PATENT DOCUMENTS

| | | | |
|---|---|---|---|
| 1,468,906 | 9/1923 | Inman | 210/454 |
| 3,498,464 | 3/1970 | Frosolone | 210/493 |
| 3,879,289 | 4/1975 | Aspinwall et al. | 210/130 |

Primary Examiner—Frank Sever
Attorney, Agent, or Firm—Gifford, Chandler, VanOphem, Sheridan & Sprinkle

[57] ABSTRACT

A fluid filtering device for use with a filter body having a chamber open at one end and a fluid inlet and a fluid outlet port in fluid communication with the chamber. The device comprises a housing formed by molding a plastic cap onto one axial end of a tubular cage. A filter element is disposed within the cage while an annular member is nondetachably secured to the other end of the cage to entrap the filter element within the cage. The cage is dimensioned so that upon insertion into the body chamber, the filter element is positioned between the inlet and outlet ports while the cap covers the open end of the chamber. In addition, a fluid bypass valve is contained within the cage and bypasses the fluid flow around the filter element from the fluid inlet to the fluid outlet upon the occurrence of a predetermined differential pressure across the filter element.

8 Claims, 4 Drawing Figures

U.S. Patent     Feb. 13, 1979     4,139,468
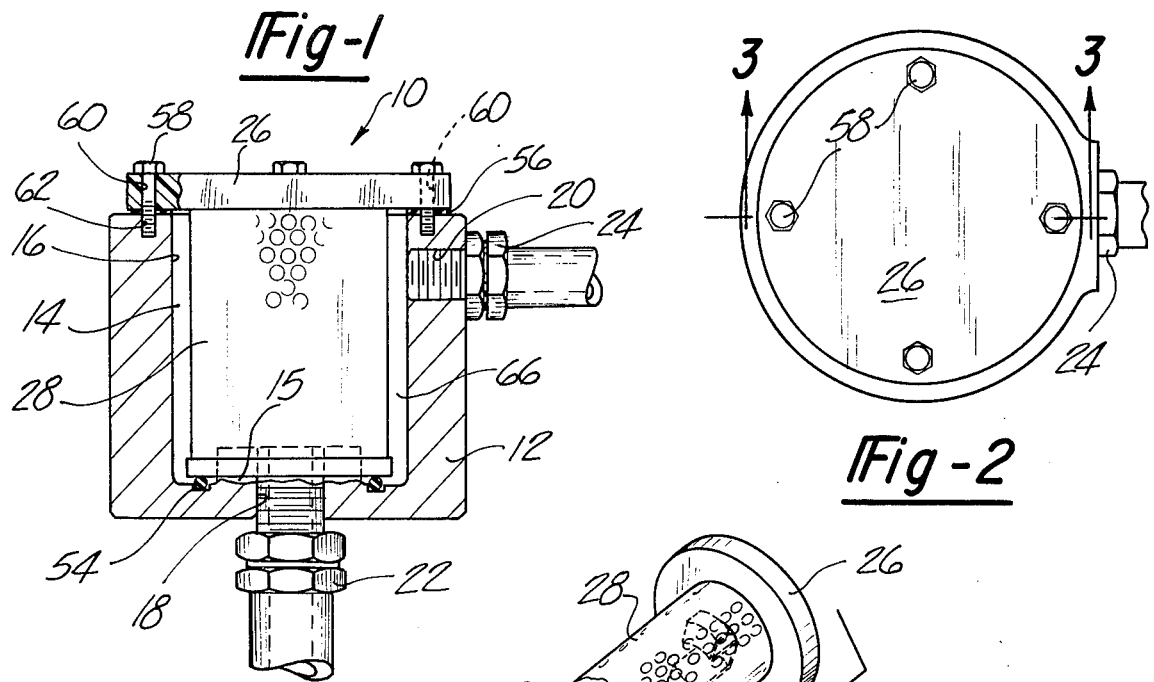
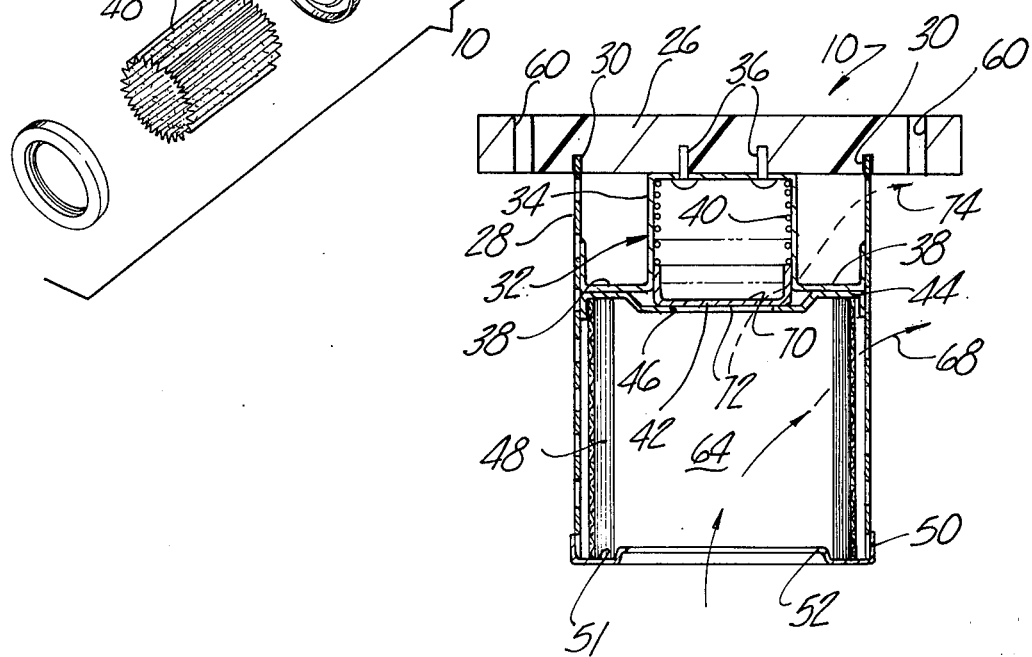

FLUID FILTERING DEVICE

CROSS REFERENCE

This is a continuation-in-part application of Ser. No. 669,610, filed Mar. 23, 1976, now abandoned.

BACKGROUND OF THE INVENTION

I. Field of the Invention

The present invention relates generally to fluid filtering devices, and, more particularly, to a fluid filtering device for use with a body having a filter chamber open at one end wherein a filter element disposed in the chamber is integrally formed with a cap to be removed and to be reinstalled upon removal and subsequent installation of the cap.

II. Description of the Prior Art

Several previously known fluid filtering devices are particularly adapted for use with machines or the like having a filter housing with a fluid chamber which is open on one end of the housing. A disposable filter element is inserted into the fluid filtering chamber through the open end of the chamber and thereafter a cap sealingly covers the open end of the chamber.

While these previously known fluid filtering devices function adequately, in practice machine workers have been known to dispose of a clogged or dirty filter element and thereafter replace the cap without inserting a new filter element within the filter chamber. The omission of a new filter element is oftentimes intentional since frequent replacement of the filter element is troublesome for unambitious workers.

The omission of the filter element from the filter chamber renders the filtering device inoperable and rapidly damages the machine as is well known in the art.

SUMMARY OF THE PRESENT INVENTION

The fluid filtering device of the present invention overcomes the above mentioned disadvantages of the previously known devices by providing such a device for use with a filter body having a filter chamber open at one end in which the filter element is nondetachably secured to the cap so that the cap and filter element must be replaced as a unit. Consequently, as long as the cap is in place it is known that the filter element is also in a fluid filtering position. The fluid system cannot function without the cap in place.

In brief, the fluid filtering device of the present invention comprises a housing formed by nondetachably molding a plastic cap onto one axial end of a tubular cage. A filter element is contained within the cage while an annular member is secured to the other end of the cage and entraps the filter element in the cage.

The cage is dimensioned so as to be insertable with the body chamber and so that, upon insertion, the filter element is positioned between the body inlet and outlet ports while the cap sealingly covers the open end of the body chamber.

In the preferred form of the invention, a bypass valve assembly is also contained within the interior of the cage. The bypass valve assembly comprises a valve member which opens at a predetermined pressure differential across the filter element to permit fluid from the fluid inlet to bypass the filter element within the body chamber.

BRIEF DESCRIPTION OF THE DRAWINGS

A better understanding of the present invention will be had upon reference to the following detailed description when read in conjunction with the accompanying drawing wherein like reference characters refer to like parts throughout the several views and in which:

FIG. 1 is a side cross sectional view of the fluid filtering device of the present invention;

FIG. 2 is a top plan view of a portion of the fluid filtering device shown in FIG. 1;

FIG. 3 is a cross sectional view of the present invention taken substantially along line 3—3 in FIG. 2; and FIG. 4 is an exploded perspective view showing several of the components of the fluid filtering device of the present invention.

DETAILED DESCRIPTION OF THE PRESENT INVENTION

With reference to FIG. 1 the fluid filtering device 10 of the present invention is thereshown for use with a filter body 12. The body 12 includes a preferably cylindrical filter chamber 14 which is open at its upper end 16. A fluid inlet port 18 fluidly communicates with the base 15 of the chamber 14 while a fluid outlet port 20 communicates with one side of the filter chamber 14. Appropriate fluid connectors 22 and 24, respectively coupled to the fluid inlet port 18 and the fluid outlet port 20, are fluidly connected to any desired fluid system (not shown).

Referring now particularly to FIGS. 3 and 4, the filter device 10 further comprises a housing 21 formed by molding a disc-shaped plastic cap 26 onto one axial end 30 of a rigid cylindrical filter cage 28, preferably constructed of perforated metal, so that the end 29 of the cage is embedded in the cap 26. The cap 26 is of greater diameter than the body chamber 14 so that the cap 26 entirely covers and encloses the open end 16 of the chamber 14 in a manner which will be later described. Also as should be apparent from FIG. 1, the axial length of the cage 28 is substantially the same as the body chamber 14 so that the cage 28 extends to the base 15 of the chamber 14.

Still referring to FIGS. 3 and 4, a bypass valve assembly 32 is secured to the cap 26 and within the cage 28. The bypass valve assembly 32 comprises a spring retainer 34 attached to the cap 26 by a pair of pins 36 and a pair of diametrically opposed radial legs 38 which extend outwardly from the spring retainer and abut against the interior wall of the cage 28. A helical spring 40 and a valve member 42 are respectively disposed within and retained by the spring retainer 34. The valve member 42 is preferably cup-shaped and adapted to entrap the downwardly depending end (FIG. 3) of the helical spring 40 therein.

An annular member 44 having a central bore 46 and an outer diameter substantially the same as the internal diameter of the cage 28 is positioned within the cage 28 until the annular member 44 abuts against the radial legs 38 of the spring retainer 34. The legs 38 thus axially position the annular member 44 within the cage 28. The central bore 46 of the annular member 44 is of a smaller diameter than the valve member 42 so that the annular member 44 forms a valve seat for the valve member 42.

A tubular and cylindrical filter element 48 is disposed within the interior of the cage 28. The filter element 48 covers the interior wall of the cage 28 between the annular member 44 and the bottom of the cage 28 and may comprise any conventional filter media such as, for example, pleated filter paper.

An annular bottom cover 50 having a central opening 52 and an annular channel 51 with a rectangular cross-sectional shape is nondetachably secured to the bottom of the cage 28 so that the filter element 48 is entrapped within the cage 28 between the channel 51 in the bottom cover 50 and the annular member 44. Any conventional means, such as a press fit, may be used to nondetachably secure the cover 50 onto the bottom of the cage 28. Due to the permanent entrapment of the filter element 48 within the cage 28, the cap 26 and filter element 48 must be installed in and removed from the filter body 12 as a unit.

With reference now particularly to FIGS. 1-3, with the device 10 positioned in the body 12, the cage 28 extends axially throughout the chamber 14 while the cap 26 covers the open end 16 of the filter chamber 14. Appropriate sealing means 54 are preferably disposed between the bottom cover 50 on the cage 28 and the base 15 of the chamber 14 while similar sealing means 56 are disposed between the cap 26 and the body 12. Bolt members 58 or the like extend axially through apertures 60 in the cap 26 and threadedly engage registering apertures 62 in the housing 12. Thus upon tightening of the bolt members 58, the cap 26 sealingly covers the open end 16 of the filter chamber 14 while simultaneously the bottom cover 50 sealingly engages the base 15 of the filter chamber 14.

With the device 10 installed within the body 12 as thus far described, the fluid inlet port 18 communicates with a cylindrical chamber 64 defined by the interior of the filter element 48, the annular member 44 and the valve member 42. Similarly the fluid outlet port 20 communicates with an annular chamber 66 defined between the cage 28 and the housing 12. Consequently, as shown by arrows 68 in FIG. 3, the fluid from the fluid inlet port 18 normally flows into the chamber 64, through the filter element 48, into the annular chamber 66 and out through the outlet 20.

After prolonged use of the filter device 10 of the present invention, the filter element 48 becomes clogged with impurities removed from the fluid and this in turn creates a differential pressure across the filter element 48 in the well known manner. The upper end 70 of the bypass valve member 42 (FIG. 3) fluidly communicates with the annular chamber 66 while the lower end 72 of the bypass valve member 42 communicates through the bore 46 with the chamber 64 so that the valve member 42 senses the differential pressure across the filter element 48. Thus in response to a predetermined differential pressure across the filter element 48, the valve member 42 opens against the force of the helical spring 40 and permits fluid flow through the filter chamber 14 to bypass the filter element 48 as shown by arrows 74. The bypass valve assembly 32 is desirable in that it prevents machine shutdown even in the case of extreme clogging of the filter element 48.

It can thus be seen that the filter device 10 of the present invention provides a simple and inexpensive filter device 10 for use with a body 12 having a filter chamber 14 which is open on one end 16. The cap 26 which sealingly covers the open end 16 of the chamber 14 is nondetachably coupled to the filter element 48 via the cage so that individual replacement and perhaps omission of the filter element 48 is precluded. Moreover, the inexpensive, and yet effective bypass valve means 32 permits fluid flow through the filter chamber 14 in spite of extreme clogging of the filter element 48 which prevents a shutdown of the machine.

Moreover, the construction of the housing by molding the plastic cap 26 onto one axial end of the cage 28 so that the cage 28 is embedded in the cap provides a simple and inexpensive housing construction and a nondetachable connection between the cage 28 and the cap 26. In addition, since the filter element 48 is contained within the interior of the cage 28, the rigid cage 28 protects the filter element 48 and prevents its removal from the cage.

Having thus described my invention, many modifications thereto will become apparent to those skilled in the art to which it pertains without deviation from the spirit of the invention as defined by the scope of the appended claims.

I claim:

1. A fluid filtering device for use with a fluid system having a body which defines a chamber open on one end and a fluid inlet port and a fluid outlet port in fluid communication with the chamber, said fluid filtering device consisting of;

a housing formed by molding a plastic cap onto and across one axial end of a tubular cage so that said end of said cage is embedded in said plastic cap, a tubular filter element disposed coaxially within the interior of said cage, nondetachable means secured to the other axial end of the cage for entrapping said filter element within the interior of the cage, a fluid bypass means contained within the interior of said cage for permitting fluid communication to bypass said filter element in response to a predetermined fluid pressure differential across said filter element said bypass means being fixedly secured to said cap above one end of the filter element, wherein said cage is dimensioned so as to be insertable into said body chamber and so that, upon insertion, said filter element is positioned between the fluid inlet port and the fluid outlet port while said cap covers the open end of the chamber, and wherein said housing, filter element and bypass means are joined together to form a unitary, single piece member which must be disposed within said chamber only as a single piece, whereby when said filter element or said bypass means become inoperative replacement of the entire fluid device is required and wherein said fluid system will not operate without the fluid device secured to the body.

2. The invention as defined in claim 1 in which one of said fluid ports is in fluid communication with the base of said fluid chamber while the other fluid port is in fluid communication with one side of the chamber and in which one of said fluid ports communicates with the interior of said filter element while the other fluid port communicates with the exterior of said filter element.

3. The invention as defined in claim 1 wherein the longitudinal length of said cage is substantially the same as the depth of said chamber.

4. The invention as defined in claim 1 and including a first annular member and a second annular member secured to said cage in a longitudinally spaced relationship and adapted to carry said filter element therebetween.

5. The invention as defined in claim 4 wherein said bypass valve means is contained within the cage between the cap and one of said annular members.

6. The invention as defined in claim 5 wherein said bypass valve means further comprises a valve member, a valve seat and means for resiliently urging said valve member towards said valve seat.

7. The invention as defined in claim 6 wherein a portion of the last mentioned annular member forms the valve seat.

8. The invention as defined in claim 1 wherein said filter element is pleated filter paper.

* * * * *